(12) United States Patent
Nadeau et al.

(10) Patent No.: US 7,373,052 B2
(45) Date of Patent: May 13, 2008

(54) PASSIVE FIBER ALIGNMENT ARRANGEMENT FOR COUPLING TO NANO-TAPER OPTICAL WAVEGUIDES

(75) Inventors: Mary Nadeau, Alburtis, PA (US); John Fangman, Leesport, PA (US)

(73) Assignee: SiOptical, Inc., Allentown, PA (US)

( * ) Notice: Subject to any disclaimer, the term of this patent is extended or adjusted under 35 U.S.C. 154(b) by 0 days.

(21) Appl. No.: 11/799,577

(22) Filed: May 2, 2007

(65) Prior Publication Data

US 2007/0258680 A1 Nov. 8, 2007

Related U.S. Application Data

(60) Provisional application No. 60/798,369, filed on May 5, 2006.

(51) Int. Cl.
*G02B 6/26* (2006.01)
*G02B 6/30* (2006.01)
(52) U.S. Cl. ............... 385/50; 385/39; 385/49
(58) Field of Classification Search ............ 385/30–31, 385/49, 50, 39, 88, 92
See application file for complete search history.

(56) References Cited

U.S. PATENT DOCUMENTS

| | | | |
|---|---|---|---|
| 5,337,398 A | 8/1994 | Benzoni et al. | |
| 5,613,024 A | 3/1997 | Shahid | |
| 5,647,044 A | 7/1997 | Basavanhally et al. | |
| 6,344,148 B1 | 2/2002 | Park et al. | |
| 6,628,854 B1 | 9/2003 | Koh et al. | |
| 6,728,450 B2 | 4/2004 | Tombling et al. | |
| 6,862,389 B2 | 3/2005 | Freund et al. | |
| 7,031,576 B2* | 4/2006 | Deane | 385/49 |
| 7,092,602 B2 | 8/2006 | Park et al. | |

\* cited by examiner

*Primary Examiner*—Frank G. Font
*Assistant Examiner*—Michael P. Mooney
(74) *Attorney, Agent, or Firm*—Wendy W. Koba

(57) ABSTRACT

An arrangement for providing passive alignment between an optical fiber and the "tip" of a nanotaper coupling waveguide (the nanotaper formed within the SOI layer of an SOI-based optoelectronic arrangement). The arrangement includes a separate fiber carrier support element, including a longitudinal V-groove for supporting the fiber and an alignment feature formed parallel thereto. The SOI structure is formed to include an associated alignment slot, so that as the fiber carrier is positioned over and attached to the SOI structure, the alignment feature and alignment slot will mate together and provide passive alignment of the optical fiber to the nanotaper waveguide tip.

6 Claims, 3 Drawing Sheets

PASSIVE FIBER ALIGNMENT ARRANGEMENT FOR COUPLING TO NANO-TAPER OPTICAL WAVEGUIDES

CROSS-REFERENCE TO RELATED APPLICATION

This application claims the benefit of U.S. Provisional Application No. 60/798,369, filed May 5, 2006.

TECHNICAL FIELD

The present invention relates to an arrangement for providing passive optical coupling between a fiber and a nano-taper optical waveguide and, more particularly, to an arrangement in the form of a fiber-carrying substrate for providing passive alignment, in a flip-chip configuration, to an optical substrate containing a nanotapered optical waveguide coupling portion.

BACKGROUND OF THE INVENTION

One of the most promising types of optical coupling into/out of "thin" optical waveguides formed within the surface layer of a silicon-on-insulator (SOI) structure has been defined as an "inverse taper", or "nanotaper". An inverse taper is generally defined as a terminating portion of a core of a high index contrast waveguide that is used to effectuate optical coupling between a fiber (or other type of optical transmitting device) and a thin waveguide. In a typical device construction, the lateral dimension of the portion of the nanotaper proximate to the core of the waveguide approximately matches the width of the core. The lateral dimension of the nanotaper decreases monotonically along the direction of light propagation until it reaches a small value associated with a 'tip" (i.e., that portion of the nanotaper distal from the core of the waveguide). The tip portion represents the point at which light first enters the high index contrast waveguide for an "entry" nanotaper, or the point at which light first exits the waveguide for an "exit" nanotaper.

Consequently, the ability to align an associated optical fiber (or an optical fiber with associated coupling elements, such as a lens) with such a small-dimensioned coupling arrangement has proved to be problematic. For the most part, "active" alignment techniques have been employed, where an optical signal is passed through an optical fiber and into the tip of a nanotapered waveguide structure. The optical coupling efficiency (measured as a function of the optical power received at a given point along the waveguide) is used as a calibration signal, where the position of the fiber endface with respect to the tip of the nanotaper is manipulated until maximum coupling efficiency is achieved.

While this "active" method has been found to provide the desired result, it would be preferable for such alignment to be achieved in a "passive" manner; that is, without the need to illuminate the fiber, measure signals and perform adjustments in real time. Thus, a need remains in the art for a passive arrangement for providing coupling between an optical fiber and a nanotapered coupling waveguide as utilized within an SOI-based optical structure.

SUMMARY OF THE INVENTION

The need remaining in the art is addressed by the present invention, which relates to an arrangement for providing passive optical coupling between a fiber and a nano-taper optical waveguide and, more particularly, to an arrangement in the form of a fiber-carrying substrate that is capable of providing passive alignment, in a flip-chip configuration, to an optical substrate containing a nanotapered optical waveguide coupling portion.

In accordance with the present invention, a fiber-carrying substrate (hereinafter referred to as a "fiber carrier", or merely "carrier") is formed to include a fiber-holding groove (preferably, a V-groove) for supporting an optical fiber along a portion of its longitudinal dimension. One or more alignment features are formed on the same surface of the carrier as the V-groove, where the alignment features are formed at predetermined spacings/locations with respect to the fiber-holding groove. The one or more alignment features of the present invention are utilized to control the location and angular rotation of the fiber carrier with respect to other system components.

The fiber carrier is passively aligned with a separate, SOI-based optical structure including at least an optical coupling nanotaper (and usually a plurality of other optical and electrical devices). One or more alignment slots are formed in a predetermined relationship with the nanotaper such that the slots will mate with the carrier's alignment features when the carrier is mounted on the top surface of the SOI substrate. Preferably, the alignment slot is formed utilizing a deep reactive-ion etch (DRIE) process, which is able to precisely locate the slot with respect to the nanotaper.

One exemplary alignment feature comprises an angular, beveled edge along the length of the fiber carrier. This beveled edge alignment feature functions as a pivot edge to provide a precision surface, establishing a vertical offset of the fiber carrier with respect to the SOI substrate. In particular, the beveled edge establishes the mating height of the optical fiber relative to the nanotaper.

It is an advantage of the utilization of the interlocking alignment feature/slot that the transverse movement between the fiber carrier and SOI structure may also be controlled, preventing unwanted forward/backward movement of one element relative to the other.

In a preferred embodiment of the present invention, the fiber carrier is formed of an injection-molded plastic piece part, simplifying the manufacture and reducing the cost of the passive coupling arrangement.

Other and further embodiments and features of the present invention will become apparent during the course of the following discussion and by reference to the accompany drawings.

BRIEF DESCRIPTION OF THE DRAWINGS

Referring now to the drawings.

DETAILED DESCRIPTION

Figure 1:
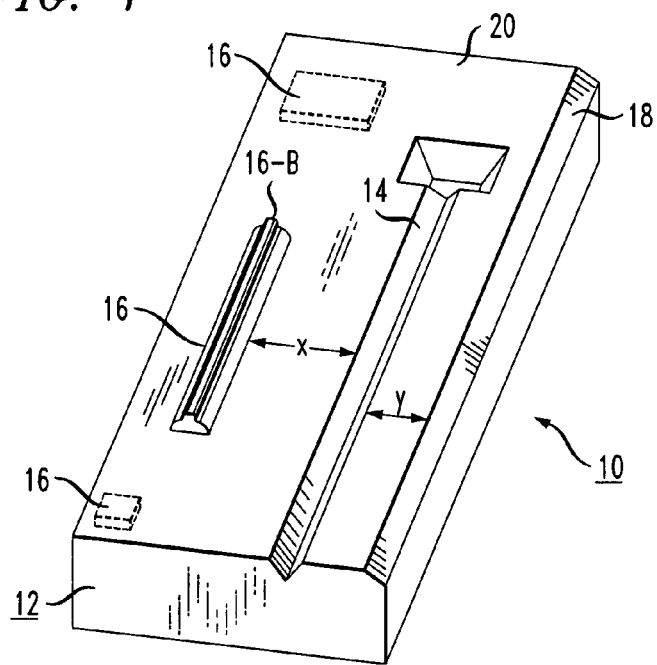
FIG. 1 contains an isometric view of an exemplary passive alignment fiber carrier formed in accordance with the present invention.

FIG. 1 contains an isometric view of an exemplary passive alignment fiber carrier 10 formed in accordance with the present invention. As will be explained in detail below, fiber carrier 10 is used to provide optical coupling between an optical fiber (held within carrier 10) and an associated nanotaper coupling waveguide formed within the surface layer of a silicon-on-insulator (SOI) substrate. Carrier 10 comprises a support base 12 of a suitable material, and is formed to include a fiber-holding groove 14 (preferably, formed as a V-groove) and associated alignment feature 16, both formed on a top major surface 20 of base 12. It is an important aspect of the present invention that alignment feature 16 be disposed parallel to V-groove 14 and separated therefrom by a predetermined distance (indicated as "x") in FIG. 1. Moreover, alignment feature 16 is formed to protrude a sufficient height above surface 20 such that back surface 16-B of alignment feature 16 will function as a longitudinal "stop" when engaging fiber carrier 16 with the associated SOI substrate. While only a single alignment feature 16 is shown in the view of FIG. 1, it is to be understood that a plurality of such features may be used to provide alignment of the mating components. A number of additional alignment features 16 are shown in phantom.

In further accordance with the present invention, carrier 10 is formed to comprise a beveled edge 18 along the lateral extent of top surface 20 of support base 12. Beveled edge 18 is formed such that V-groove 14 is positioned between edge 18 and alignment feature 16, this distance shown by the value "y" in FIG. 1. As will be discussed below, beveled edge 18 is utilized as a pivot edge in the passively aligned arrangement of fiber carrier 10 and an associated SOI substrate.

Figure 2:
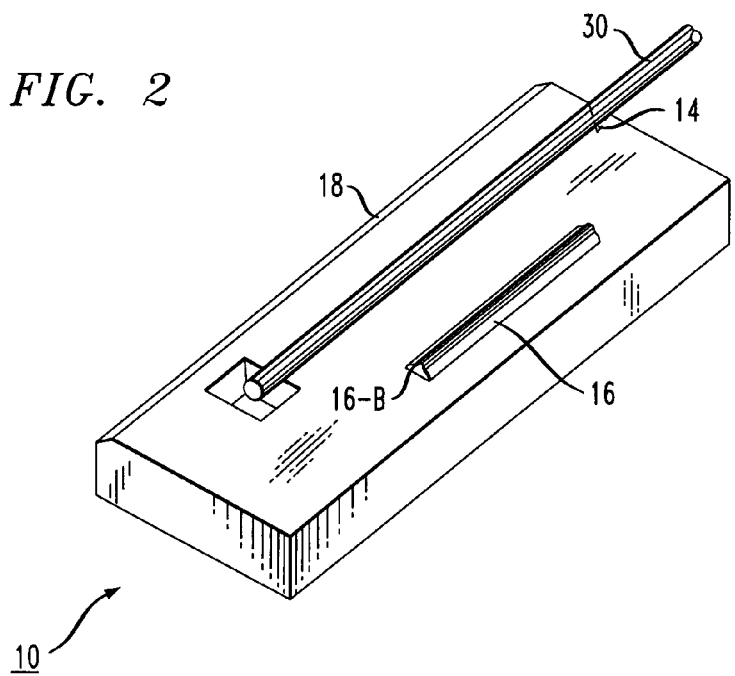
FIG. 2 is an alternative view of the fiber carrier of FIG. 1, illustrated from the opposite direction.

FIG. 2 is a view of fiber carrier 10 from the opposite direction, in this case with an optical fiber 30 disposed in place along V-groove 14 (indeed, V-groove 14 is obstructed in this view by the placement of fiber 30). Optical fiber 30 is preferably permanently fixed within V-groove 14, using any appropriate bonding material/process that will prevent movement of fiber 30 with respect to V-groove 14. The "fixed" relationship between fiber 30 and alignment feature (s) 16 results in allowing a passive alignment process to an associated nanotaper waveguide to be employed.

In one embodiment of the present invention, fiber carrier 20 is formed of a plastic material that can easily be injection molded to form the desired elements as shown in FIGS. 1 and 2. Inasmuch as injection molding is capable of providing the required micron-level tolerance in the separation "x" between V-groove 14 and feature(s) 16 and the separation "y" between V-groove 14 and beveled edge 18, the formation of the inventive carrier in this particular embodiment is relatively efficient and inexpensive, particularly when compared to prior art coupling arrangements that required the use of etched/processed silicon support members. It is to be noted, however, that there exist many other materials and associated formation processes that may be used to fabricate the passively aligned carrier of the present invention. For example, silicon is indeed an alternative material choice suitable for use as fiber carrier 10 of the present invention, if desired.

Figure 3:
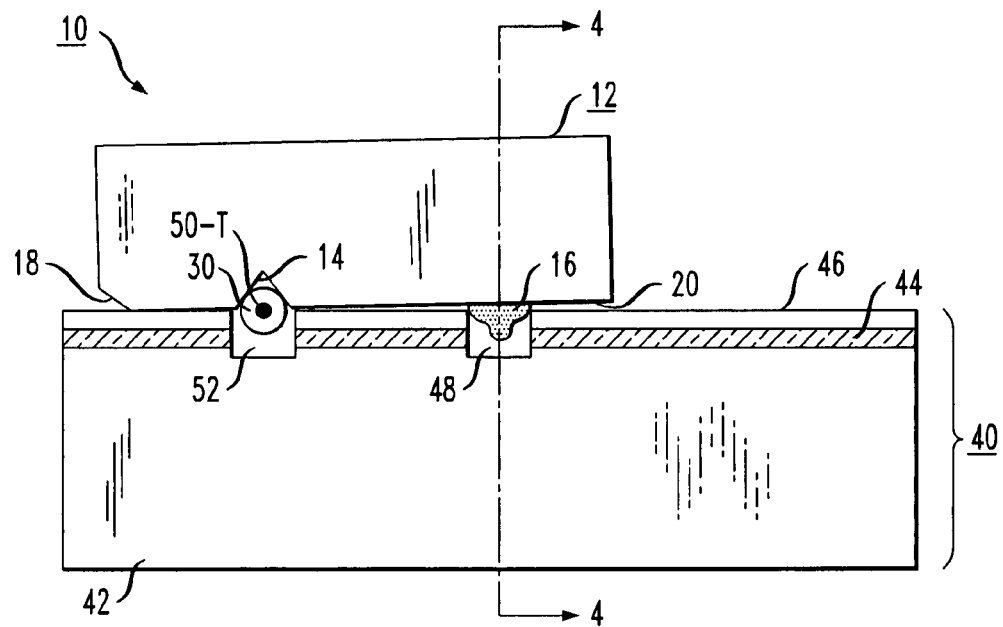
FIG. 3 is a cut-away end view of an exemplary fiber carrier disposed over, and passively aligned with, an exemplary SOI substrate.

FIG. 3 is a cut-away end view of fiber carrier 12 disposed over, and aligned with, an exemplary SOI substrate 40 containing an optical nanotaper 50 (to provide coupling to/from optical fiber 30), as well as additional components. SOI substrate 40 comprises a silicon base layer 42, an insulating (oxide) layer 44 and a surface silicon layer 46 (generally referred to as the "SOI layer"), where SOI layer 46 generally comprises a thickness of less than one micron and is usually processed to include various elements of the required optical devices, including the nanotaper coupler. In this cut-away end view, tip 50-T of nanotaper 50 is shown.

In order to provide passive optical alignment between fiber 30 and optical nanotaper 50, one or more alignment slots 48 are formed through SOI layer 46, oxide layer 44 and into silicon base material 42. In accordance with the present invention, the number and location of alignment slots 48 are configured to coincide with the one or more alignment features 16 so as to mate with alignment features 16 when fiber carrier 10 is placed in position and attached to SOI substrate 40. Preferably, a precision-controlled process is used to form alignment slot(s) 48 (for example, a deep reactive-ion etch process) so that micron-level tolerances can again be achieved. Importantly, the location of alignment slot(s) 48 relative to nanotaper 50 needs to be well-controlled to ensure that alignment feature(s) 16 will fit therein in such a manner as to remain motionless (as required for passive alignment). Ideally, alignment slot(s) 48 should be slightly smaller than the associated alignment feature(s) 16 to facilitate passive alignment.

A separate cavity 52 is formed within SOI substrate 40 through SOI layer 46, oxide layer 44 and a portion of silicon base material 42 to provide the necessary clearance for fiber 30. In accordance with the present invention, the endface of fiber 30 will passively align with tip 50-T of nanotaper waveguide 50 when fiber carrier 10 is mounted on SOI substrate 40. As a result of using the mating alignment feature/slot combination, passive optical alignment between optical fiber 30 and nanotaper 50 is achieved in accordance with the present invention.

As mentioned above, a significant aspect of the present invention is the formation of the pivot edge (e.g., beveled edge 18) to establish the vertical position of fiber carrier 10 with respect to an associated, mated SOI substrate. This is also shown in FIG. 3, where beveled edge 18 is in direct contact with the top surface of SOI substrate 40.

Figure 4:
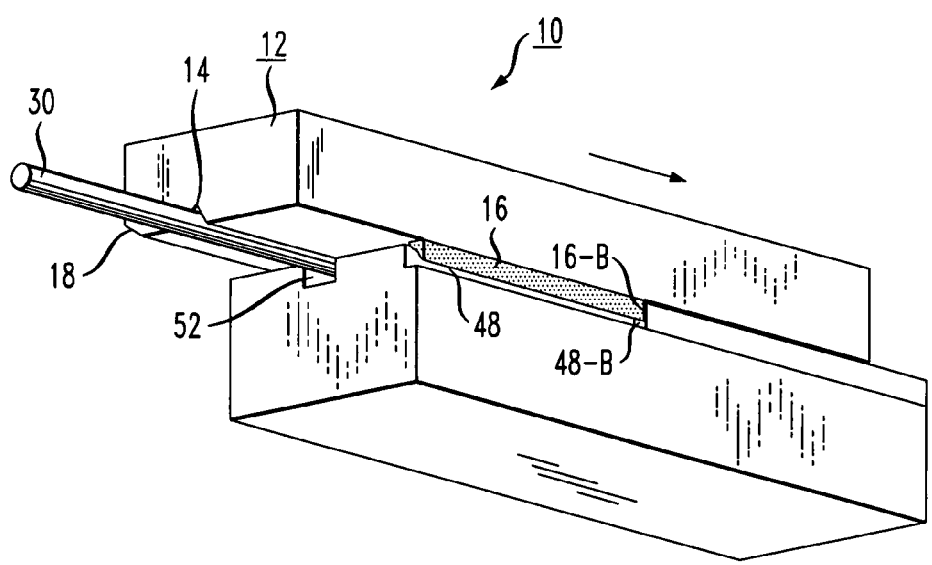
FIG. 4 is a cut-away isometric view of the arrangement of FIG. 3, taken along line 4-4.

FIG. 4 is an isometric view of fiber carrier 10 in position over SOI substrate 40, taken along line 4-4 of FIG. 3. Evident in this particular view is the rear edge 48-B of alignment slot 48, which mates with the back surface 16-B of alignment feature 16 as shown to prevent forward/backward ("longitudinal") movement of fiber carrier 10 with respect to SOI substrate 40, By virtue of using rear edge 48-B as a "stop", the longitudinal (axial) separation between the endface of optical fiber 30 and tip 50-T of nanotaper 50 to remain constant, an important attribute of any coupling arrangement.

Figure 5:
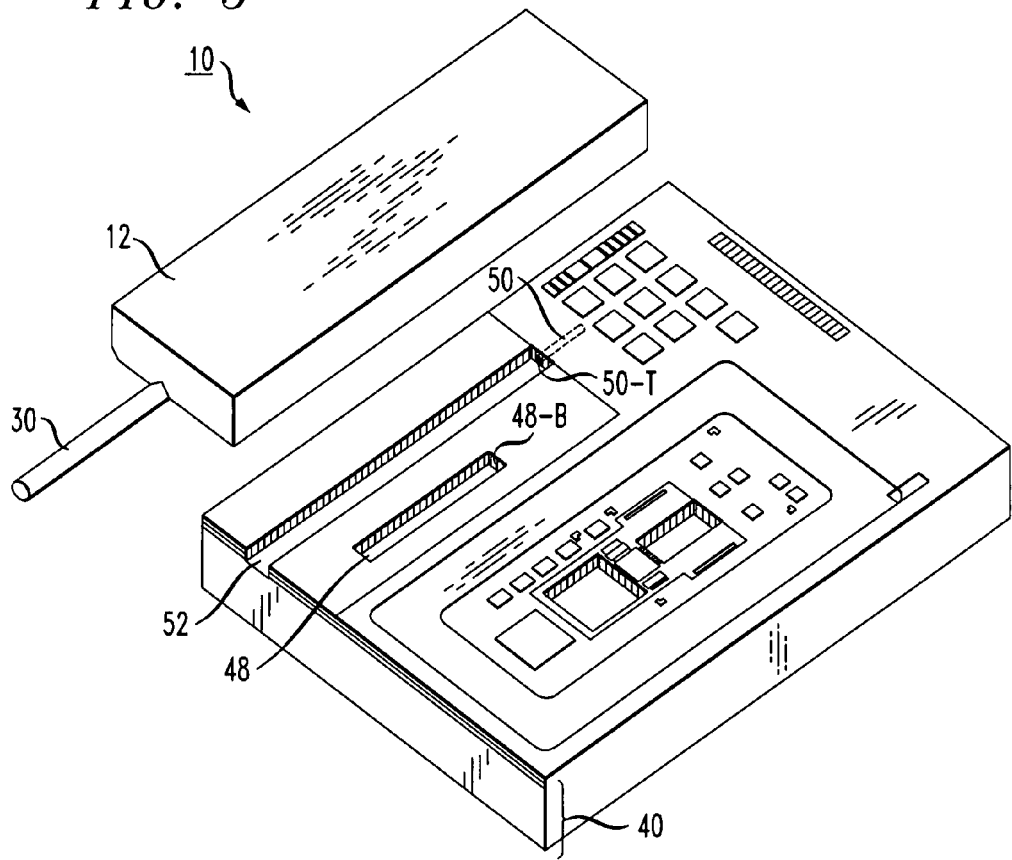
FIG. 5 is an exploded isometric view of an exemplary fiber carrier in position above an SOI substrate comprising a nanotaper coupling region and various other components.
Figure 6:
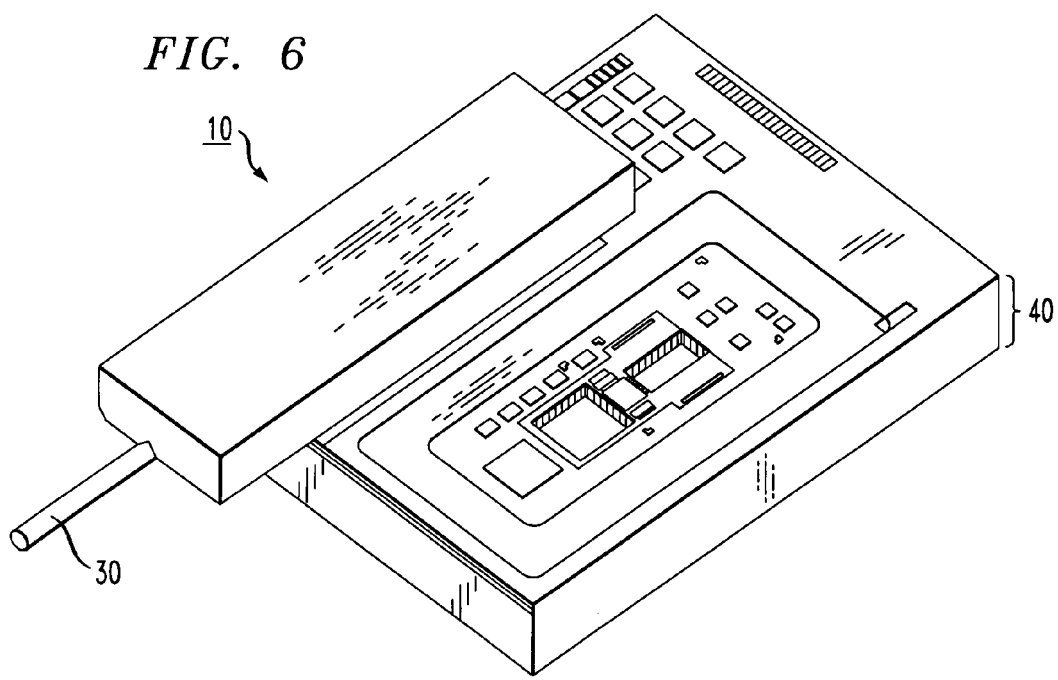
FIG. 6 is an alternative view of the elements of FIG. 5, with fiber carrier in its passively aligned position with respect to the SOI substrate.

FIG. 5 is an exploded isometric view of fiber carrier 10 in position above SOI substrate 40. Evident in this view is nanotaper waveguide 50 (including tip 50-T), alignment slot 48 (including rear edge 48-B) and cavity 52. FIG. 6 is a view of the same arrangement of SOI substrate 40, in this case with fiber carrier 10 attached thereto. By virtue utilizing the passive alignment feature/slot combination, optical fiber 30 will be aligned with and coupled to nanotaper waveguide 50 as soon as the components are joined together.

From the invention thus described, it will be obvious that the embodiments of the present invention may be varied in many ways. Such variations are not to be regarded as a departure from the spirit and scope of the invention, and all such modifications as would be obvious to one skilled in the art are intended for inclusion within the scope of the invention as defined by the following claims.

What is claimed is:

1. An arrangement for providing passive optical alignment between an optical fiber and a nanotaper coupling waveguide formed in an SOI structure, the coupling arrangement comprising
   a fiber carrier support member including a fiber-holding groove formed along a top surface thereof and at least one alignment feature disposed offset from said fiber-holding groove and separated therefrom by a predetermined distance, the fiber carrier support member further comprising a beveled edge along the top surface, disposed such that the fiber-holding groove is disposed between the beveled edge and the at least one alignment feature; and
   an SOI structure including a surface silicon layer including the nanotaper coupling waveguide, an oxide layer and a silicon base layer, said SOI structure further comprising a cavity region formed through said surface silicon layer, said oxide layer and into said silicon base layer so as to expose a tip portion of the nanotaper coupling waveguide, and at least one alignment slot formed through said surface silicon layer, said oxide layer and into said silicon base layer and separated therefrom by the predetermined distance separating the fiber-holding groove and the at least one alignment feature, wherein the fiber carrier support member is positioned over the SOI structure such that an optical fiber disposed within the fiber-holding groove protrudes into the SOI structure cavity region and the at least one alignment feature protrudes into and mates with the at least one alignment slot.

2. An arrangement as defined in claim 1 wherein the fiber-holding groove of the fiber carrier support member comprises a V-groove.

3. An arrangement as defined in claim 1 wherein the at least one alignment feature comprises a first alignment feature having a predetermined length L and the associated first alignment slot comprises a length greater than L, such that upon positioning of the fiber carrier support member over the SOI structure the first alignment feature may be translated along the length of the first alignment slot until contact between the vertical walls thereof is achieved.

4. An arrangement as defined in claim 1 wherein the fiber carrier support member comprises a plastic material.

5. An arrangement as defined in claim 4 wherein the fiber carrier support member comprises an injection-molded plastic component.

6. An arrangement as defined in claim 1 wherein the cavity region and the alignment slot within the SOI structure are formed using a deep reactive ion etch (DRIE) process.

* * * * *